United States Patent [19]

Josserand

[11] Patent Number: 4,563,120

[45] Date of Patent: Jan. 7, 1986

[54] DEVICE FOR STORING AND/OR RETRIEVING OBJECTS

[75] Inventor: Marie R. Josserand, Voiron, France

[73] Assignee: Maatel, Grenoble, France

[21] Appl. No.: 480,032

[22] Filed: Mar. 29, 1983

[30] Foreign Application Priority Data

Apr. 2, 1982 [FR] France .................. 82 06105

[51] Int. Cl.⁴ .............................................. B65G 1/04
[52] U.S. Cl. .................................. 414/273; 414/280
[58] Field of Search ............... 414/273, 274, 278, 280, 414/786, 276

[56] References Cited

U.S. PATENT DOCUMENTS

| | | | |
|---|---|---|---|
| 3,531,002 | 9/1970 | Lemelson | 414/273 |
| 3,822,025 | 7/1974 | Loos . | |
| 3,883,008 | 5/1975 | Castaldi | 414/280 |
| 3,938,190 | 2/1976 | Semmlow et al. . | |
| 3,964,577 | 6/1976 | Bengtsson | 414/280 X |
| 4,285,623 | 8/1981 | Stephens . | |
| 4,361,411 | 11/1982 | Liddo | 414/280 X |

FOREIGN PATENT DOCUMENTS 2221363 10/1974 France .
2251500 6/1975 France .

Primary Examiner—Robert G. Sheridan
Attorney, Agent, or Firm—Beveridge, DeGrandi and Weilacher

[57] ABSTRACT

The device (1) consists of a carriage (10) which can move in front of a set of storage supports (2), with this carriage being movable along an upright (11) which is itself movable along cross members (25, 26) and carrying means (35) for moving the object from the set of storage supports (2) onto the carriage (10) and/or from the carriage (10) into the set of storage supports (2), with a set of electronic control and/or management circuits being provided to operate the means of moving the said upright (11) and the said carriage as well as the means (35) for moving the object so as to move the object up to a location in the set of storage supports and vice versa.

Application to storing cassettes or books.

3 Claims, 4 Drawing Figures

DEVICE FOR STORING AND/OR RETRIEVING OBJECTS

This invention relates to a device and a method for storing and/or retrieving objects.

At present objects such as, in particular, cassettes, tapes, books or any other article are stored in racks or in cabinets and the operations which consist in storing, extracting, identifying, locating or classifying the objects are carried out by hand. This leads, in particular, to considerable waste of time in looking for a specific object and ignorance of the objects stored. In addition, hire of objects like video cassettes or books is tending to increase considerably at the present time. Problems in storing and managing their stocks arise for people renting out such objects.

In order to answer the problem raised by the state of the art, the present invention first of all proposes a device for individually conveying objects, in order to store or stock them, respectively to a specific location in a set of storage supports having an access face and/or to individually extract the objects placed in the set of storage supports and to convey them so they are made available.

The device according to this invention is of a type that comprises means for moving a carriage conveying the objects individually in front of the said access face of the said set of storage supports and drive means for moving the object carried by the carriage from the carriage up to its location in the said set of storage supports and/or vice versa to move an object from its location in the said set of storage supports to the carriage.

According to this invention the said means for moving the said carriage may advantageously comprise a beam along which the said carriage can move, guide means along which the said beam can move roughly parallel to itself, drive means for moving the said carriage along the said beam and drive means for moving the said beam along the said guide means.

According to this invention the said drive means for moving the object from the carriage into the set of storage supports and/or vice versa from the set of storage supports onto the carriage may advantageously be carried by the carriage.

According to this invention the said carriage may advantageously carry means of reading the code borne by each of the said objects in order to distinguish them from each other.

The device according to the present invention may also advantageously comprise a set of electronic circuits controlling the said drive means and/or managing the free locations and/or the locations occupied by objects in the said set of storage supports.

According to the present invention the said set of electronic circuits may advantageously comprise a set of memories which store the code of each of the objects stored in the said set of storage supports as well as the identification of the location occupied in this set of storage supports by the object bearing this code.

According to this invention the said set of memories is preferably capable of supplying an image of the unoccupied locations and/or locations occupied by objects in the said set of storage supports.

According to this invention the said set of electronic circuits may also comprise an interface of manually entering the code for calling up one of the objects placed in the set of storage supports and/or the order to store an object, along with a microcomputer connected to the interface and to the set of memories and capable of controlling the said drive means to move the said carriage in order to fetch the object whose code has been entered in the interface and/or controlling the said drive means for moving the carriage in order to convey an object up to an unoccupied location in the said set of storage supports.

This invention also relates to a method for individually conveying objects from a predetermined place respectively to a specific location in a set of storage supports having an access face and/or vice versa, individually extracting the objects placed in the said set of storage supports and conveying them to the predetermined place.

According to the present invention this method consists in conveying an object, in order to store it, from the said special place in front of the access face of the said set of storage supports until it is opposite a selected previously unoccupied location, and in moving this object to this unoccupied location and/or vice versa, so that it can be extracted from the said set of storage supports, and in extracting a previously selected object placed in a specific location in the said set of storage supports and in conveying it in front of the access face of the said set of storage supports to the said special place.

The method according to this invention may also consist in moving the said object to be stored, in order to store it, from a service station before it is conveyed in front of the access face of the said set of storage supports and/or, vice versa, so it can be extracted, in moving the said object to be extracted up to the said service station after conveying it in front of the access face of the said set of storage supports.

The method according to the invention may also consist in order to identify it, in locating the object to be stored or extracted and/or in locating the location it is going to occupy or occupies in the set of storage supports.

A device for applying the above method may advantageously consist of means for conveying and/or moving individually the said objects, means of reading the code carried by the said objects, as well as a set of electronic circuits comprising a set of memories which store the image of the locations occupied and/or unoccupied in the set of storage supports along with the code of each of the stored objects and the identification of the location occupied by the object carrying this code, an interface for manual entry and/or display of commands and/or queries to the said set of memories and a microcomputer for managing and processing the queries and/or these commands in order to control the said means.

This invention will be more clearly understood on studying a device designed for storing and retrieving objects, described as a non-restrictive example and illustrated schematically in the drawings in which.

Figure 1:
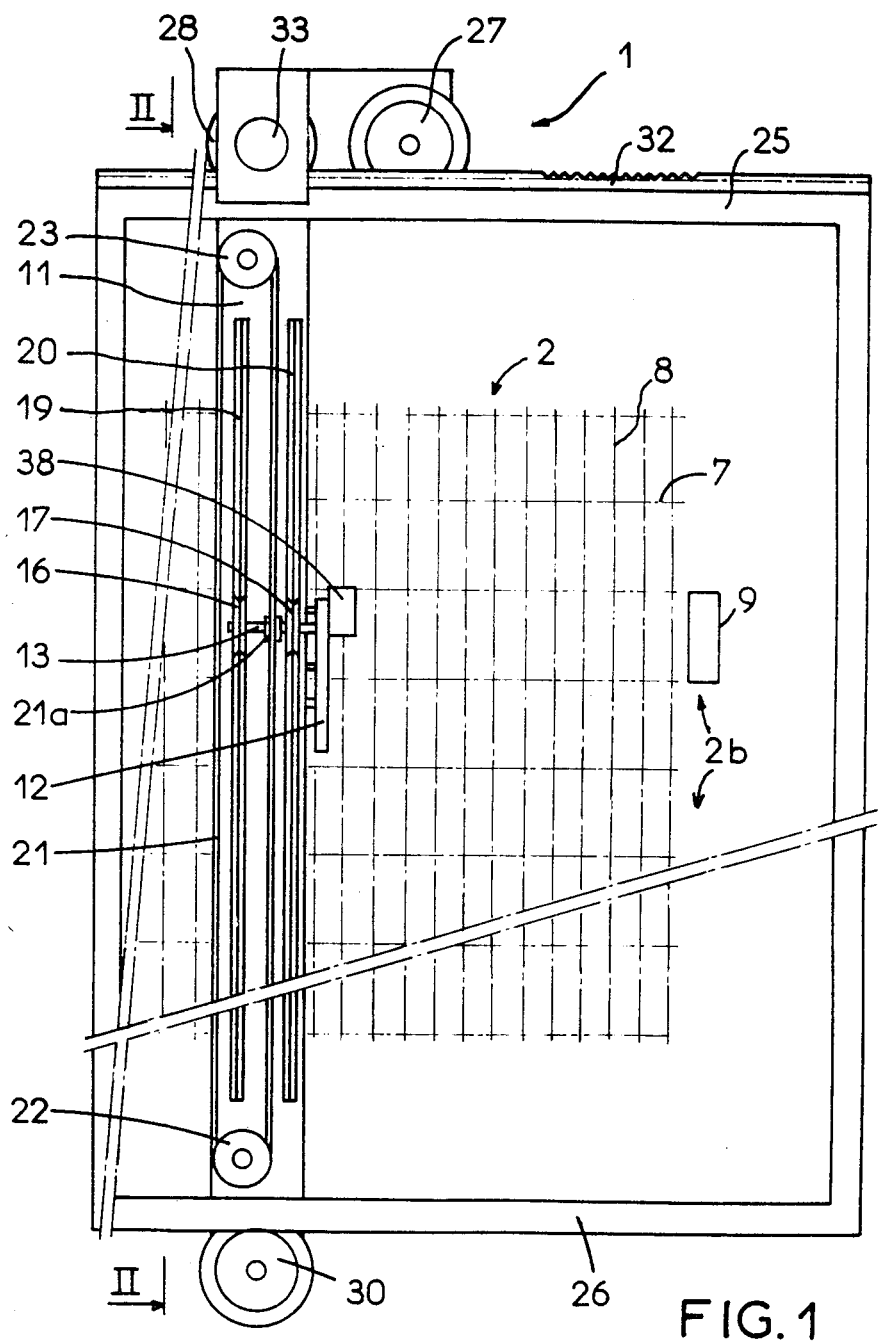
FIG. 1 shows an elevation view of the device.
Figure 2:
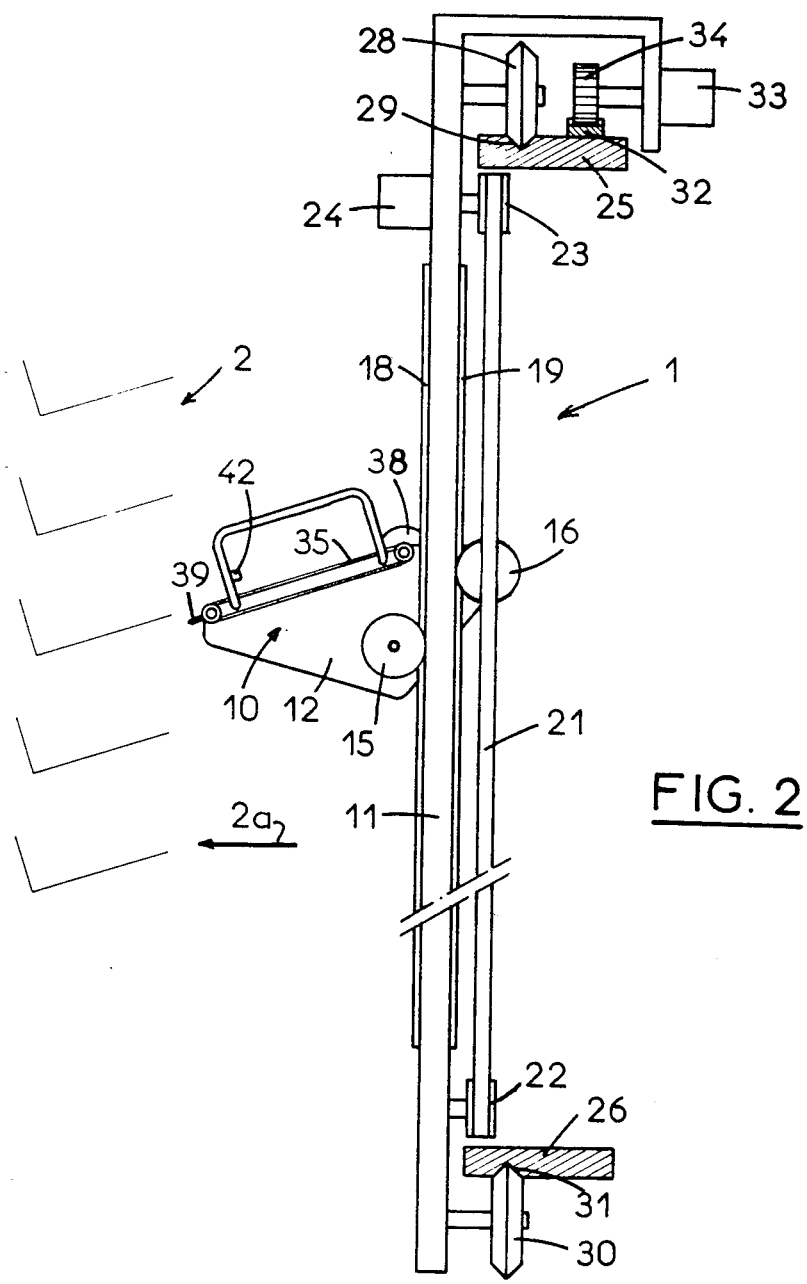
FIG. 2 shows a section view along II—II of the device shown in FIG. 1.
Figure 3:
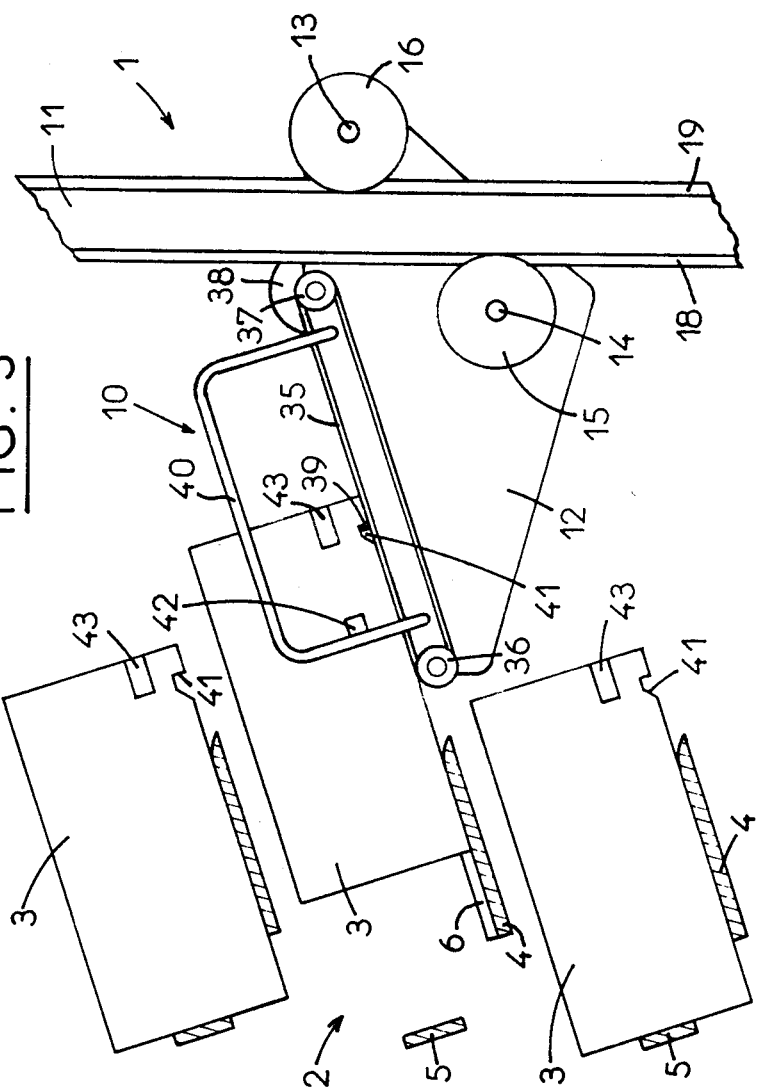
FIG. 3 shows an enlarged view of a part of the device shown in FIGS. 1 and 2 along II—II in FIG. 1.
Figure 4:
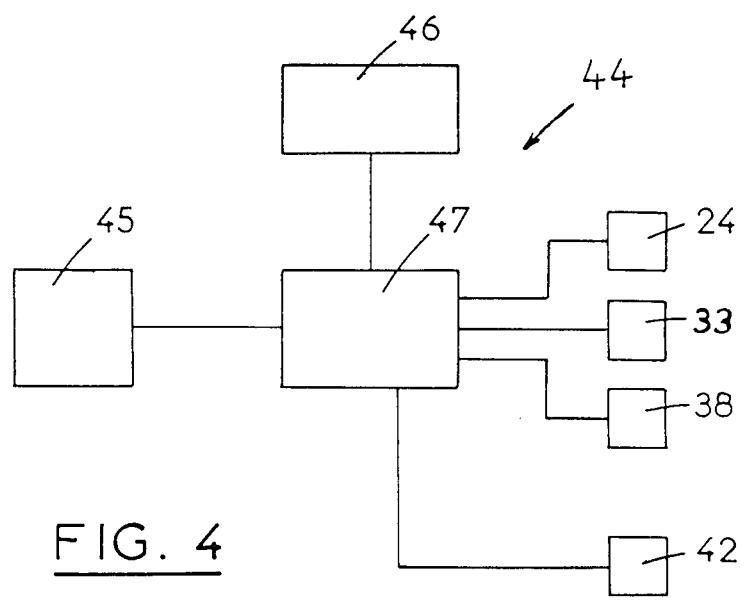

and FIG. 4 shows the block diagram of a set of electronic circuits designed to control the appliance shown in FIGS. 1 to 3.

The device or system for storing and retrieving objects shown in FIGS. 1 to 3 is marked overall by the reference 1. This device is combined with a set of storage supports marked overall by the reference 2. In the example the objects to be stored and extracted from the set of storage supports 2 are parallelepiped blocks 3 seen in FIG. 3 which may be boxes each containing a cassette, for example.

As can be seen in FIG. 3, the set of storage supports 2 comprises a series of horizontal shelves placed one above the other. Each shelf comprises a support plate 4 and a back plate 5 which are perpendicular so forming a V which is open upwards, with the support plate 4 sloping slightly back so that the object 3 placed on this support plate is held by it own weight in contact with the back plate 5 which forms a stop. Since plates 4 and 5 are placed some distance apart above each other, the set of storage supports 2 has a vertical access face marked by the arrow 2a shown in FIG. 2.

As can be seen in FIG. 3, the support plates 4 have transverse ribs 6 which bound recesses into which the objects 3 can be put, these objects being supported on one of their edges and perpendicularly to the shelves.

Referring to FIG. 1 it can be seen in the example that the shelves are so designed that the objects 3 can be placed in the set of storage supports 2 along horizontal lines 7 and along vertical lines 8.

The set of storage supports 2 is combined with a service station 9 shown schematically in FIG. 1 by a rectangle. This service station 9 is designed to receive just one object 3 in the same position with respect to the said vertical access face 2a as the position it can occupy in the set of storage supports 2. On the same vertical line as this service station 9, the set of storage supports has a free column marked in FIG. 1 by the number 2b. The service station 9 may consist of a portion of shelf.

The device 1 is designed to individually convey objects 3 from the service station 9 up to one of the locations in the set of storage supports 2, or inversely to convey an object 3 located in the set of storage supports up to the service station 9.

For this purpose the device 1 comprises a carriage marked overall by the reference 10 which can move in front of the access face 2a of the set of storage supports 2. The carriage 10 can move along a vertical upright or beam 11. The carriage 10 has a transverse carrier plate 12 extending vertically on one side of the upright 11 and two horizontal shafts 13 and 14, with shaft 14 being placed on the side of the set of storage supports 2 and carrying a wheel 15 whilst shaft 13 is placed on the other side of the upright 11 and carries two vertical wheels 16 and 17. Wheels 15, 16 and 17 have an annular peripheral groove and can run on and are guided by rails 18, 19 and 20 respectively which are mounted vertically on the upright 11.

In order to move the carriage 10 vertically a toothed belt 21 is provided, which could be replaced by a chain, which has vertical side runs and which is wound round a bottom pulley 22 mounted on the upright 11 and a top pulley 23 capable of being driven in rotation by an electric motor 24 fixed to the upright 11. One of the sides of the toothed belt 21 is fixed to the carriage in such a way that when the electric motor 24 is operated the toothed belt 21 moves the carriage 10 vertically along the rails 18, 19 and 20 which carry the upright 11. In the example the said toothed belt 21 side is fixed to the shaft 13 at 21a.

The device 1 also has a top horizontal cross member 25 and a bottom horizontal cross member 26 which are parallel to the said access face 2a. The top end of the upright 11 carries two wheels 27 and 28 which run in a groove 29 made longitudinally along the upper face of the cross member 25 and the bottom end of the upright 11 carries a wheel 30 which runs in a groove 31 made longitudinally along the lower face of the bottom cross member 26 so that the upright 11 can move horizontally along the cross members 25 and 26 so moving parallel to itself in front of the access face 2a of the set of storage supports 2. In order to drive the upright 11 in translation the top cross member 25 carries a rack 32 which runs parallel to the groove 29 and the upper section of the upright 11 carries an electric motor 33, the rotational shaft of which carries a toothed wheel 34 meshing with the rack 32. When the motor 33 is operated the upright 11 can be moved as a result.

From the above description it follows that the carriage 10, by actuation of the electric motors 24 and 33, can be moved so as to take up any position in front of face 2a giving access to all the storage supports 2.

Referring to FIG. 3 in particular, it can be seen that the carriage 10 carries an endless belt 35 which is fitted on two pulleys 36 and 37, with the pulley 36 located on the side of the set of storage supports 2 being rotatably fitted on plate 12, whilst the pulley 37 located on the side of the upright 11 is carried by the shaft of an electric motor 38 fixed to this plate 12. The top side of the toothed belt 35 has the same slope as the support plates 4 forming the shelves of all the storage supports 2. In addition, the toothed belt 35 carries a lug 39 extending outwards. The carriage 10 also has two guides 40 which are fixed to the plate 12 and which bound between them a channel running above the top side of the toothed belt 35.

It can be seen in FIG. 3 that when the carriage 10 is positioned in front of the set of storage supports 2 so that the top side of the toothed belt 35 is roughly aligned with the upper face of the support plate 4 of a shelf, by actuation of the electric motor 38 to rotate the toothed belt 35 in a direction corresponding to raising the lug 39 it carries, this lug 39 enters a cavity 41 in the under edge of the object 3 which is borne by the support plate 4 and extracts the object 3 from the location it occupies in the set of storage supports 2 and places it on the carriage 10. The reverse operation, which consists in transferring the object 3 from the carriage 10 to a location in the set of storage supports 2 can be performed by making the toothed belt 35 rotate in the other direction. In FIG. 3 an object 3 has been shown in an intermediate position straddling the support plate 4 and the carriage 10.

The device shown in FIGS. 1 to 3 can be used to store objects 3 in the set of storage supports 2 or to extract an object 3 from this set of storage supports 2.

In order to store an object 3, with the carriage 10 located opposite the service station 9, the object to be stored is placed in this service station so that the edge thereof having the cavity 41 is underneath and on the side of the carriage 10, so that the object takes up roughly the same position in this service station 9 as it would occupy in the set of storage supports 2.

The electric motor 38 is actuated so as to rotate the toothed belt 35 in such a direction that the lug 39 on it enters the cavity 41 in the object and pulls this object so that it is placed on the carriage 10. When the object being stored has left the service station 9 and is placed on the carriage 10, the electric motor 38 is stopped. The object placed on the carriage 10 is held in the transverse direction by the lug 39 which is carried by the toothed belt 35 and laterally by the guides 40.

Then the electric motor 24 is actuated so as to move the carriage 10 vertically along the upright 11 in the free column 2b so as to place the object being stored at the level of one of the support plates 4 on which it is required to lay the object.

Next the electric motor 33 is actuated so as to move the upright 11 parallel to itself along the horizontal cross members 25 and 26 in front of the access face of the set of storage supports 2. When the object 3 being stored is opposite the location in which it is wished to place it the electric motor 33 is stopped.

Then, by actuating the motor 38 in the other direction, the toothed belt 35 moves the object towards the set of storage supports 2 so that the object slides onto the support plate 4 of the corresponding shelf and butts against its back plate 5. At the end of its travel the lug 39 carried by the toothed belt 35 moves downwards away from the object's cavity 41.

In order to carry out the reverse operation, which consists in taking an object to be extracted from the set of storage supports 2 and bringing it to the service station 9, it is enough to carry out the reverse operations, first bringing the carriage 10 opposite the object to be extracted.

The device 1 also comprises an optical reader 42 which is carried by the carriage 10 and which makes it possible to read the code carried laterally at 43 on each of the objects 3. This code can therefore be read when the object 3 is moved by the toothed belt 35 before the reader 42. Each of the objects 3 may also bear a code on the front face which can be read by the optical reader 42 when the carriage 10 is moved horizontally by means of the electric motor 33.

The device 1 and the set of storage supports 2 is combined with a set of management and control electronic circuits shown in FIG. 4 and marked overall by the reference 44.

This electronic unit 44 comprises a data entry and display interface 45 consisting, for example, of a keyboard and a screen, a set of memories 46 and a microcomputer 47 linked to the interface 45 and to the memory unit 46 and also linked to the code reader 42 as well as to the controls of the electric motors 24, 33 and 38. It is advantageous to these motors to be stepping motors.

The microcomputer 47 is designed to be capable of managing the orders entered manually through the interface 45, the memory unit 46, the code reader 42 and the control of the electric motors 24, 33 and 38.

Examples of operation of the device 1 in conjunction with the set of electronic circuits 44 will now be described.

First of all it can be pointed out that the set of memories 46 can notably be designed to store the code of each of the objects placed in the set of storage supports 2, the reference of the location occupied by the object bearing this code in the set of storage supports 2 and the image of the occupied and/or unoccupied locations of the set of storage supports 2.

If it is wished to have one of the objects 3 delivered to the service station 9, the code corresponding to this specific object is entered by the interface 45. The microcomputer 47 then searches the memory unit 46 to find out the location of this specific object in the set of storage supports 2. Knowing the location reference of this specific object the microcomputer 47 operates the electric motors 24, 33 and 38 to move the carriage 10, as has already been seen, in order to take this specific object and bring it to the service station 9. When this specific object is extracted from the set of storage supports 2 in order to be placed on the carriage 10 the code reader 42 can read the code of this specific item and the microcomputer 47 can then decide whether the extracted object corresponds to the specific object asked for. When this specific item is extracted the microcomputer 47 updates all the memories 46, for example by erasing the code of this specific extracted item and by updating the image of the occupied or unoccupied locations in the set of storage supports 2.

For the reverse operation consisting in storing an object in the set of storage supports 2, this object is put into the service station 9. A storage command is entered via the interface 45. The microcomputer then selects a free location in the set of storage supports 2 by searching the set of memories 46. When a specific free location is selected the microcomputer 47 then controls the motors 24, 33 and 38 so as to move the carriage 10 and take the object being stored up to the location selected in the set of storage supports 2, as was seen previously. As the object travels in front of the code reader 42 the microcomputer 47 records the code of the item being stored. The microcomputer 47 can then alter the contents of the memory unit 46 accordingly.

The set of electronic circuits 44 can fulfil many other functions. For example by scanning the memory unit 46 using the interface 45 it is possible to know whether any specific object is available in the set of storage supports 2 and it is possible, in a general way, to know the contents of the set of storage supports 2 along with its level of occupation.

The system which has just been described possesses many advantages and, in particular, it permits the storage and management of borrowed objects like cassettes or books. Moreover, it should be noted that it can allow a much bigger number of objects to be handled than that corresponding to the number of locations available in the set of storage supports 2, since, over time, a number of objects are borrowed whilst others are stored and there is a turnover between the stored objects and the borrowed objects.

The present invention is not restricted to the example described above. Many other variants on the device for storing and/or retrieving objects according to this invention are possible without going outside the framework defined by the appended claims.

I claim:

1. Apparatus for conveying individual objects between a service station and the compartments of a set of storage supports, said objects being provided with identifying codes, comprising, a set of storage supports having an access face in front of which the object to be conveyed is moved and having storage compartments for receiving said objects, a set of electronic circuits for controlling said conveying apparatus, a code means carried by each object to be stored in said set of storage supports, code reading means for detecting the code of said objects, a set of memories for keeping in memory the code of each object stored in a compartment of said set of storage supports and the code of this compartment, so as to have in memory the code of each compartment associated to the code of the object which is therein and an image of the occupied and/or unoccupied compartments of said set of storage supports, an interface for entering the code of one of the objects placed in said set of storage supports, a micro computer means linked to the interface and to the set of memories for managing thereof, said micro computer means being operable to control said conveying means to convey the object whose code has been entered on the interface to the service station from the compartment having the code associated to the code of this object, said micro computer also being operable, when the apparatus is storing objects, to select an unoccupied compartment for an object and to control the conveying means to store the object in said selected compartment, said apparatus having a carriage which is movable in front of the access face of said set of storage supports, and drive means for moving an object carried by the carriage from the carriage to its location in the set of storage supports and vice versa, said carriage carrying the code reading means for reading the code of the objects.

2. The apparatus of claim 1 having a beam along which the said carriage can move, drive means for moving the carriage along the beam, guide means along which the said beam can move roughly parallel to itself, and drive means for moving said beam along said guide means, transfer means for moving an object from the carriage into the set of storage supports and vice versa, said transfer means being carried by said carriage and comprising a belt provided with a lug which can enter a cavity in the object in order to move the object, and means for driving the belt in both directions.

3. The apparatus of claim 1 for conveying individual objects which are provided with external lug-receiving cavities, said apparatus having a beam along which the said carriage can move, said drive means being operable to move the carriage along the beam, guide means for guiding the beam for movement generally parallel to itself, said drive means also being operable to move said beam along said guide means, transfer means for moving an object from the carriage into the set of storage supports and vice versa, said carriage having two lateral guides forming a channel for receiving the objects, said transfer means being carried by said carriage and comprising an endless belt having a top side extending under said channel and provided with a transferring lug which extends outwards, said lug being operable to enter a cavity in the object when moving upwards and to leave the cavity when moving downwards in order to move the object, and means for driving the belt in both directions.

* * * * *